(12) United States Patent
Belmonte et al.

(10) Patent No.: US 10,408,069 B2
(45) Date of Patent: Sep. 10, 2019

(54) RADIAL CONTROL SHAFT FOR A DEVICE FOR CONTROLLING THE PITCH OF FAN BLADES OF A TURBINE ENGINE HAVING AN UNDUCTED FAN, AND A METHOD OF MOUNTING SUCH A SHAFT

(71) Applicant: SNECMA, Paris (FR)

(72) Inventors: Olivier Belmonte, Perthes en Gatinais (FR); Emmanuel Pierre Dimitri Patsouris, Melun (FR); Thomas Julien Nguyen Van, Alfortville (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 546 days.

(21) Appl. No.: 15/150,832

(22) Filed: May 10, 2016

(65) Prior Publication Data

US 2016/0333709 A1 Nov. 17, 2016

(30) Foreign Application Priority Data

May 12, 2015 (FR) ...................................... 15 54280

(51) Int. Cl.
*F01D 7/00* (2006.01)
*F04D 29/32* (2006.01)
*F02K 3/072* (2006.01)
*B64C 11/30* (2006.01)
(Continued)

(52) U.S. Cl.
CPC .............. *F01D 7/00* (2013.01); *B64C 11/306* (2013.01); *F02K 3/072* (2013.01); *F04D 29/323* (2013.01);
(Continued)

(58) Field of Classification Search
CPC .......... F01D 7/00; F01D 25/16; F01D 25/162; F01D 17/162; F02K 3/072; F04D 29/323;
(Continued)

(56) References Cited

U.S. PATENT DOCUMENTS 3,994,128 A * 11/1976 Griswold, Jr. ........ F04D 29/323
 60/226.1
4,047,842 A * 9/1977 Avena ....................... F01D 7/00
 416/152
(Continued)

FOREIGN PATENT DOCUMENTS

WO WO 2013/050704 A1 4/2013

OTHER PUBLICATIONS

French Preliminary Search Report dated Mar. 10, 2016 in French Application 15 54280 filed on May 12, 2015 (with English Translation of Categories of Cited Documents).

*Primary Examiner* — Jason D Shanske
*Assistant Examiner* — Eric J Zamora Alvarez
(74) *Attorney, Agent, or Firm* — Oblon, McClelland, Maier & Neustadt, L.L.P.

(57) ABSTRACT

A radial control shaft for a device for controlling the pitch of fan blades of a turbine engine having an unducted fan, is disclosed. The shaft includes an external portion that is designed to be mounted in the control device from its outside and to be coupled to at least one fan blade in order to adjust its pitch, and an internal portion, independent of the external portion, that is designed to be mounted from the inside of the control device, to be connected to a load transfer bearing in order to pivot the shaft about a radial axis, and to close an oil enclosure in which the bearing is housed, the external and internal portions of the shaft being coupled to each other. A method of mounting such a shaft and a control device including such a shaft are also disclosed.

12 Claims, 4 Drawing Sheets

(51) Int. Cl.
　　　*F16C 3/02*　　　(2006.01)
　　　*B64D 27/00*　　　(2006.01)
(52) U.S. Cl.
　　　CPC .......... *F16C 3/02* (2013.01); *B64D 2027/005* (2013.01); *F05D 2220/32* (2013.01); *F05D 2260/74* (2013.01)
(58) Field of Classification Search
　　　CPC ... F04D 29/362; F16C 3/02; B64D 2027/005; F05D 2220/32; F05D 2260/74; B64C 11/306; B64C 11/32
　　　See application file for complete search history.

(56) References Cited

U.S. PATENT DOCUMENTS

| | | | |
|---|---|---|---|
| 4,657,484 A * | 4/1987 | Wakeman | B64C 11/306 415/130 |
| 5,152,668 A * | 10/1992 | Bulman | B64C 11/32 416/129 |
| 5,431,539 A * | 7/1995 | Carvalho | B64C 11/32 416/157 R |
| 5,533,825 A * | 7/1996 | Stone | F01D 5/026 403/359.6 |
| 8,336,290 B2 * | 12/2012 | Glynn | B64C 11/38 416/157 B |
| 2012/0070290 A1 * | 3/2012 | Balk | B64C 11/32 416/147 |
| 2012/0070292 A1 * | 3/2012 | Balk | B64C 11/306 416/168 A |
| 2012/0099987 A1 * | 4/2012 | Belmonte | B64C 11/32 416/34 |
| 2013/0011261 A1 * | 1/2013 | Boston | B64C 11/32 416/147 |
| 2013/0017087 A1 | 1/2013 | Gallet | |
| 2013/0052016 A1 | 2/2013 | Szymandera | |
| 2014/0205457 A1 * | 7/2014 | Curlier | B64C 11/306 416/160 |
| 2014/0294585 A1 | 10/2014 | Escure et al. | |

\* cited by examiner

RADIAL CONTROL SHAFT FOR A DEVICE FOR CONTROLLING THE PITCH OF FAN BLADES OF A TURBINE ENGINE HAVING AN UNDUCTED FAN, AND A METHOD OF MOUNTING SUCH A SHAFT

BACKGROUND OF THE INVENTION

The present invention relates to the general field of turbine engines fitted with one or two unducted fans, and more particularly it relates to controlling the pitch of the fan blades of such engines.

A preferred field of application for the invention lies in open-rotor turbojets having two contrarotating propellers, which may be located relative to the gas generator, either downstream in a "pusher" configuration, or upstream in a "puller" configuration. Nevertheless, the invention also applies to turboprops having one or more propulsive propellers.

In a turbojet with contrarotating propellers, it is known that the pitch of the blades constituting the propellers constitutes one of the parameters enabling the thrust of the turbojet to be controlled, in particular by ensuring that the propeller always operates under the best possible conditions. Specifically, the speed of rotation of the propellers is practically constant during all stages operation, and it is the pitch of the propeller blades that varies thrust. Such pitch variation serves in particular to enable the propeller to operate under the best possible conditions. Thus, during a stage of cruising flight, it is desired to obtain the lowest possible power on the turbine shaft that is needed in order to obtain given traction at a given speed of the airplane so as to obtain best efficiency (i.e. the efficiency that serves to minimize fuel consumption and increase range). Conversely, during takeoff, the strongest possible traction is sought in order to accelerate the airplane and then cause it to take off.

The mechanism for controlling the pitch of the propeller blades of the turbojet is generally incorporated inside the hub carrying the propellers. More precisely, the pitch of each blade making up a propeller is typically controlled by a radial control shaft that passes through a casing arm in coincidence with the pitch axis of the blade and that has a lever arm at its inner end for enabling it to be turned about the pitch axis. An actuator that is stationary relative to the structures of the engine and that is centered on the longitudinal axis of the engine, then serves to drive movement in translation of the inner ring of a load transfer bearing (LTB) that is positioned in line with the actuator. The bearing serves to transmit the movement in translation from the stationary reference frame associated with the actuator to a rotary reference frame associated with the blades. Furthermore, for each control shaft, a pitch control rod connects the end of each lever arm to the outer ring of the LTB. Reference may be made in particular to Document WO2013/050704, which describes an implementation of such control.

That type of mechanism requires access to the hubs of the propellers of the engine in order to assemble the various elements making it up. However, for certain turbojet architectures, in particular for turbojets with contrarotating propellers in a pusher configuration, such access is limited by the fact that the hubs are masked by the rotary casings that reconstitute the air-flow passage through the engine. Specifically, with such a turbojet architecture, the radial control shafts need to be engaged via the inside of the hub carrying the propeller through casing arms and then to be coupled by means of fluting to the blade roots. In order to achieve this, it is therefore necessary for the space available inside the hub carrying the propeller to have a diameter that is at least equivalent to the length of the control shafts.

However, since it is desired to reduce the diameters of turbojet propeller hubs in order to improve the propulsive efficiency of propellers, it is becoming more and more difficult to insert the control shafts via the insides of the hubs.

OBJECT AND SUMMARY OF THE INVENTION

A main object of the present invention is thus to propose a control shaft for a blade pitch control device that does not have the above-mentioned drawbacks.

This object is achieved by a radial control shaft for a device for controlling the pitch of fan blades of a turbine engine having an unducted fan, said shaft comprising an external portion that is designed to be mounted in the control device from its outside and to be coupled to at least one fan blade in order to adjust its pitch, and an internal portion, independent of the external portion, that is designed to be mounted from the inside of the control device, to be connected to a load transfer bearing in order to pivot said control shaft about a radial axis, and to close an oil enclosure in which said load transfer bearing is housed, the external and internal portions of the control shaft being coupled to each other.

Having recourse to a control shaft made as two mutually independent portions makes it possible to solve the problems associated with inserting the shaft in the hub of the turbojet carrying the propeller. Specifically, the internal portion of the control shaft (which carries the lever arm) can be engaged via the inside of the hub, even if the hub is of small diameter, and the external portion of the shaft can be inserted from the outside of the air-flow passage. The control shaft is thus entirely compatible with reducing the diameters of the propeller hubs of turbojets.

Furthermore, the internal portion of the control shaft remains in place inside the hub carrying the propeller, and thus acts as a plug for the oil enclosure housing the LTB and the control shaft actuator, thereby reducing the risk of oil leaking out from this enclosure. In particular, this oil enclosure is a critical point since it contains the elements of the blade pitch control device that need a large amount of lubrication and considerable flow rates of oil (for the actuator, for the bearings that support rotation of the propellers relative to the casing, for the LTB, etc.).

Finally, given that the external portion of the control shaft is accessible from outside the air-flow passage, it is possible to remove it without that requiring previous removal of the rotary casings. This simplifies maintenance operations, since in order to remove the rotary ring on which the blade pivots are mounted there is no need to dismantle a complex set of mechanisms situated inside an oil enclosure. By means of this two-portion control shaft, it is possible to separate the device for controlling the pitch of each of the fan blades by removing the external portions of the control shafts without any need to disassemble the fan blades or the rotary ring that drives them in rotation.

The two independent portions of the shaft may be coupled to each other by fluting of complementary shapes.

Preferably, the internal portion of the shaft includes a lever arm designed to be coupled to an outer ring of the load transfer bearing, and the external portion of the shaft has a coupling system for coupling to at least one fan blade.

Advantageously, the internal portion of the shaft is designed to be mounted through a hub casing with a ball bearing being interposed between them. Under such circumstances, the internal portion of the shaft may have a first shoulder designed to come radially into abutment against the ball bearing while said internal portion is being mounted via the inside of the control device, and a second shoulder that is the radially offset outwards relative to the first shoulder and that is designed to come into abutment against a shoulder of the hub casing while mounting said internal portion via the inside of the control device.

Likewise, the external portion of the shaft is advantageously designed to be mounted on a rotary ring and to be held thereon by a nut. Since the nut can be manipulated from the outside, it is easy to remove the external portion of the shaft from the outside.

Preferably, the radial axis of the shaft is offset axially and/or tangentially relative to a pitch axis of the fan blade that it controls.

Invention also provides a method of mounting a radial control shaft as defined above, the method comprising mounting the external portion of the shaft in a control device from its outside, mounting the internal portion of the shaft in the control device from its inside, and coupling together the internal and external portions of the shaft.

The invention also provides a device for controlling the pitch of fan blades of a turbine engine having an unducted fan, the device comprising at least one set of adjustable-pitch fan blades, said set being constrained to rotate with a rotary ring, the fan blades being coupled, for pitch adjustment purposes, to at least one radial control shaft as defined above, the external portion of each control shaft being coupled to at least one fan blade, and the internal portion of each control shaft being mechanically linked to a load transfer bearing designed to enable said control shaft to pivot about its radial axis.

Preferably, the rotary ring holds the external portion of the control shaft radially and leaves it free to turn. Also preferably, the device further comprises a hub casing that serves to hold the internal portion of the control shaft radially and leaves it free to turn.

BRIEF DESCRIPTION OF THE DRAWINGS

Other characteristics and advantages of the present invention appear from the following description made with reference to the accompanying drawings, which show an embodiment having no limiting character. In the figures.

DETAILED DESCRIPTION OF THE INVENTION

Figure 1:
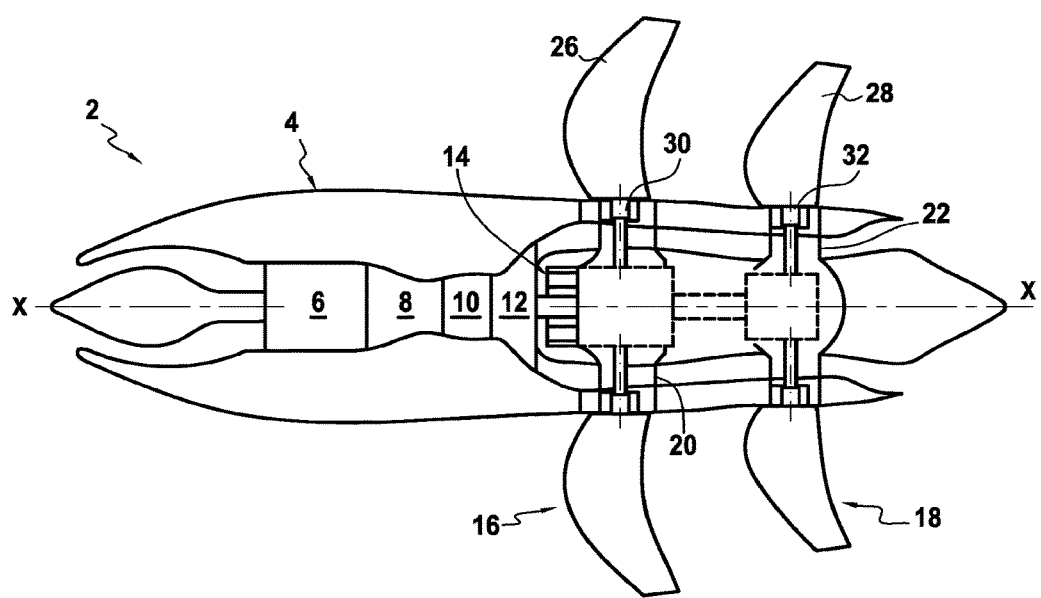
FIG. 1 is a diagrammatic longitudinal section view of a turbojet with contrarotating propellers to which the invention applies.

The invention applies to a turbine engine having at least one unducted fan, in particular to turboprops having one or more propulsive propellers, and also to open-rotor turbojets having two contrarotating propellers located relative to the gas generator either upstream in a "puller" configuration, or else downstream in a "pusher" configuration, like the pusher type turbojet 2 shown diagrammatically in FIG. 1.

In known manner, the turbojet 2 comprises, from upstream to downstream in the flow direction of the gas flow inside a nacelle 4 of the turbojet: one or two compressors 6 (depending on the single- or two-spool architecture of the gas generator); a combustion chamber 8; a high-pressure turbine 10 (or a high-pressure turbine and an intermediate pressure turbine, depending on said architecture); and a low-pressure turbine 12 that acts, via an epicyclic step-down gearbox 14, to drive an upstream propeller 16 and a downstream propeller 18 in contrarotation, which propellers are in axial alignment on the longitudinal axis X-X of the turbojet and are located downstream from the combustion chamber.

For this purpose, the upstream propeller 16 is secured to a rotary ring 20 centered on the longitudinal axis X-X of the turbojet and coupled in rotation to one outlet of the gearbox 14 in order to rotate in one direction, while the downstream propeller 18 is secured to another rotary ring 22 likewise centered on the axis X-X and coupled in rotation to another outlet of the gearbox 14 in order to rotate in an opposite direction. The coupling between the outlets of the gearbox and the rotary rings of the propellers is conventional and is therefore not described in detail herein.

Furthermore, each blade 26 of the upstream propeller 16 and each blade 28 of the downstream propeller 18 is provided with a root that is mounted on a respective blade root support 30, 32, each of these blade root supports being pivotally mounted on the corresponding rotary ring 20, 22. Thus, pivoting of the blade root supports about the pitch axes of the blades they carry enables the orientation or pitch of the blades to be varied.

The turbojet 2 also has a device for controlling the pitch of the blades of each propeller 16, 18. Such a device 16 for controlling the pitch of the blades 26 of the upstream propeller is shown diagrammatically in FIGS. 2 and 3. Naturally, the device is equally applicable to controlling the pitch of the blades of the downstream propeller of the turbojet.

In known manner, the control device comprises in particular an annular actuator 34 centered on the longitudinal axis X-X of the turbojet, and a link mechanism connecting the actuator to the supports 30 for the roots of the blades 26 of the upstream propeller.

The actuator 34 surrounds a stationary annular casing 36 of the turbojet, being secured thereto in such a manner that its static portion (i.e. its rod) is prevented from moving relative thereto, both in rotation and in translation. The chamber 38 of the actuator is suitable for moving axially (i.e. along the longitudinal axis X-X), and it is connected to the link mechanism.

The link mechanism comprises in particular a load transfer bearing (LTB) 40 provided with an inner ring 42 mounted on the chamber 38 of the actuator 34 and an outer ring 44, the inner and outer rings defining raceways for rolling elements (two rows of balls 46 in this example). As a result, an axial movement of the chamber 38 of the actuator drives the same movement in translation of the LTB along the longitudinal axis X-X.

The actuator 34 and the LTB 40 are housed in an oil enclosure 47 defined radially between the casing 36 and a casing hub 49 that is spaced radially outwards relative to the casing.

The link mechanism also has radial control shafts 48 (i.e. shafts that are arranged radially relative to the longitudinal axis X-X of the turbojet), each control shaft being designed to adjust the pitch of at least one blade 26 of the upstream propeller.

Figure 2:
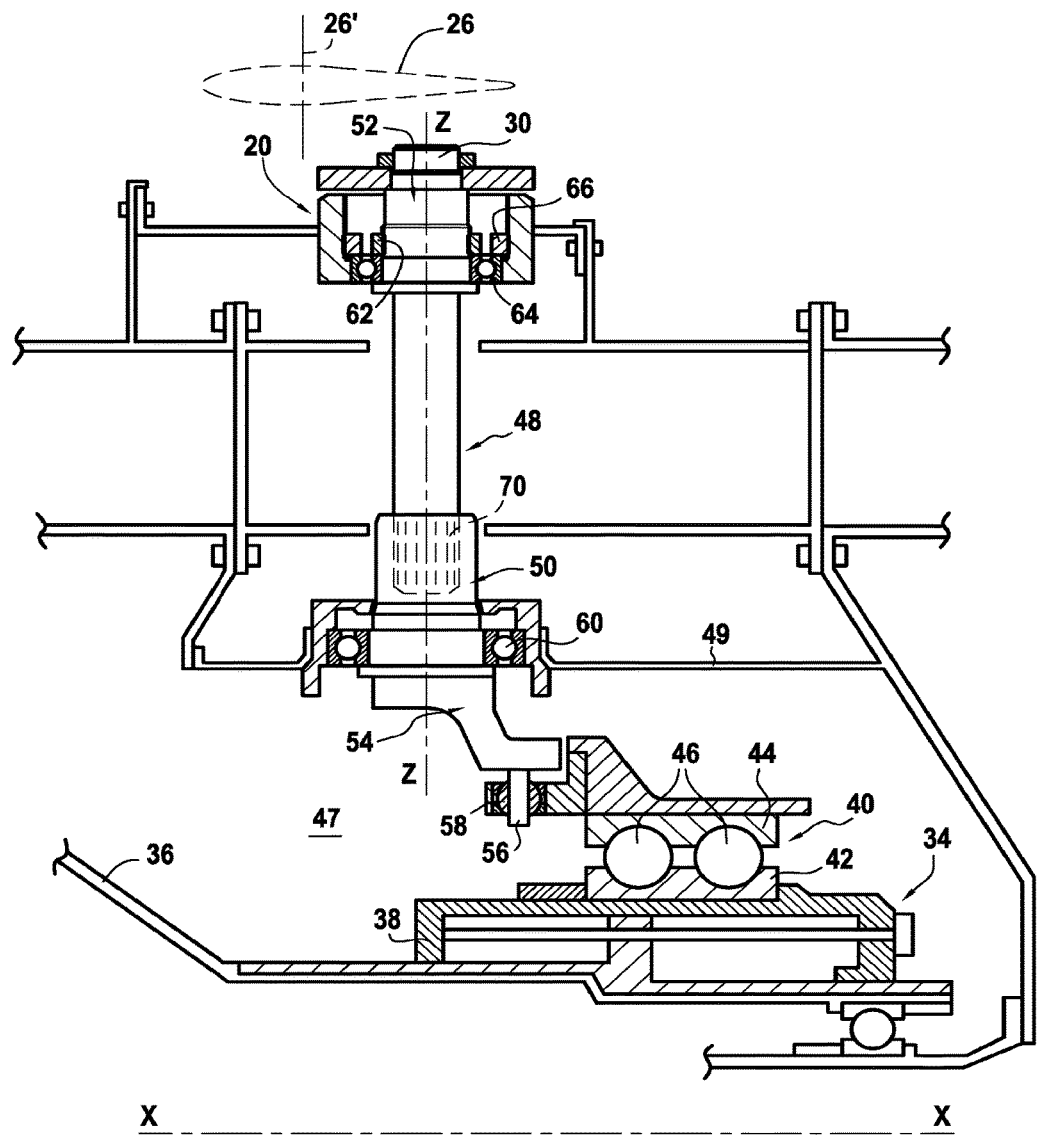
FIGS. 2 and 3 are longitudinal section views of a control device in two different pitch positions and fitted with control shafts of the invention.
Figure 3:
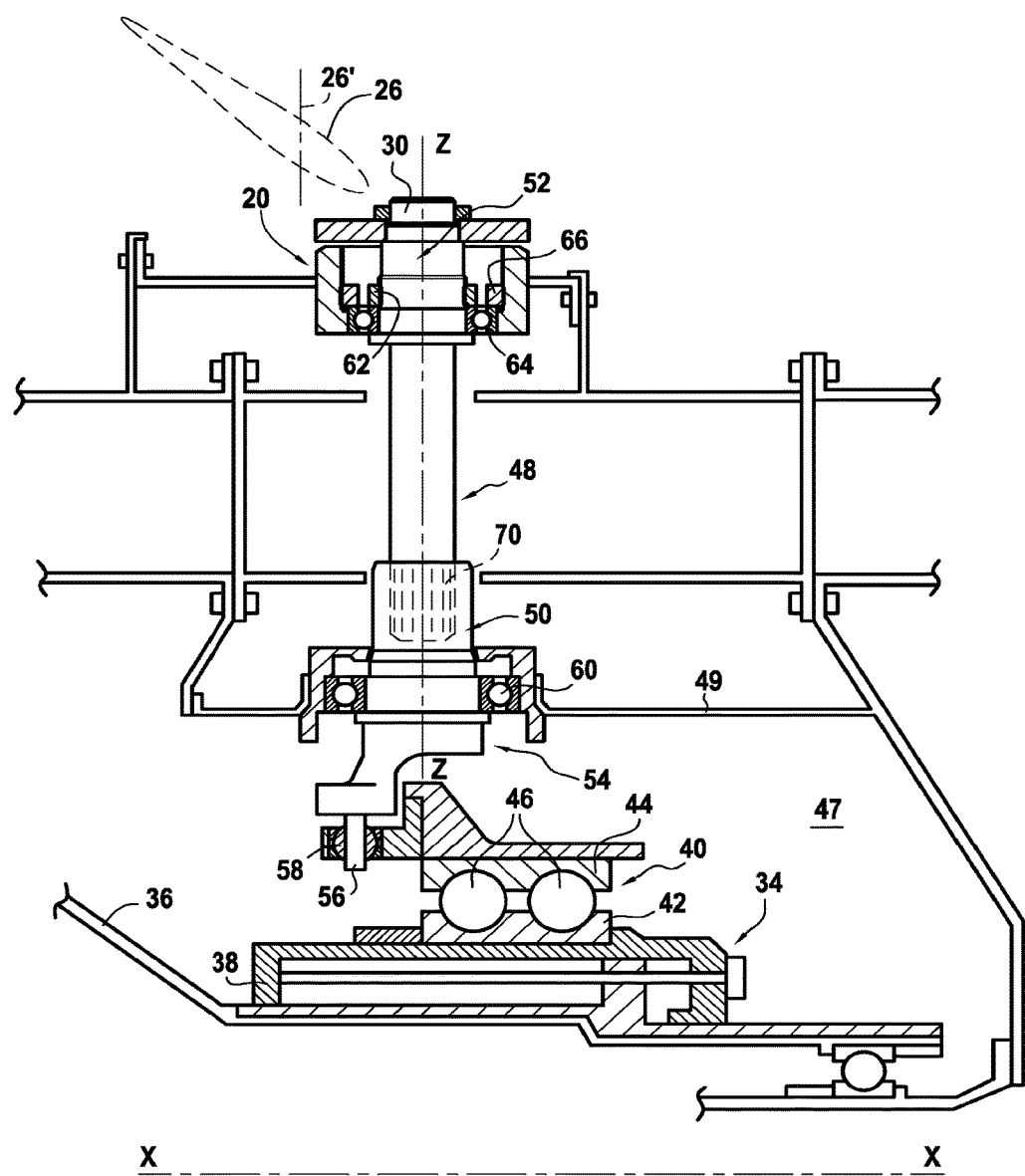

More precisely, each control shaft 48 may extend along a radial axis Z-Z that is offset axially and/or tangentially relative to the blade root(s) controlled by the shaft (see FIGS. 2 and 3 where the radial axis Z-Z of the shaft is axially offset relative to the pitch axis 26' of the blade 26). These control shafts 48 are suitable for pivoting about their radial axes Z-Z while being constrained to rotate with the rotary ring 20 that drives the upstream propeller in rotation.

In accordance with the invention, each control shaft 48 is made up of two mutually independent portions that are coupled together, namely an internal portion 50 for being mounted via the inside of the hub casing 49, and an external portion 52 for being mounted via the outside of the annular air-flow passage (i.e. beside the rotary ring 20).

More precisely, at its radially outer end, each control shaft 48 is coupled via its external portion 52 to at least one blade root support 30 by any conventional coupling means. By way of example, reference may be made to French patent application number 15/54275 filed by the Applicant on May 12, 2015 and entitled "Dispositif à arbre radial pour la commande de l'orientation des pales de soufflante d'une turbomachine a soufflante non carénée" [A radial shaft device for controlling the pitch of fan blades of a turbine engine having an unducted fan], which application describes an example of such a coupling linkage between the control shafts 48 and the blade root supports 30. Briefly, that patent application describes coupling in which each control shaft enables the pitch of at least two consecutive blades to be controlled by means of driven and driving eccentrics. As a result, pivoting of the control shafts 48 about their radial axes Z-Z causes the pitch of the blades 26 of the upstream propeller to be modified.

Furthermore, at its radially inner end, the internal portion 50 of each control shaft 48 has a lever arm 54 that pivots with the control shaft about its radial axis Z-Z. The lever arm 54 may be integral with or independent of the internal portion of the control shaft. The lever arms 54 are also coupled to the outer ring 44 of the LTB 40, e.g. via a finger 56 carried by the lever arm and co-operating with a sliding ball joint 58 carried by the outer ring 44 of the bearing. By way of example, reference may be made to French patent application number 15/54279 filed by the Applicant on May 12, 2015 and entitled "Dispositif à bras de levier pour la commande de l'orientation des pales de soufflante d'une turbomachine a soufflante non carénée" [A lever arm device for controlling the pitch of fan blades of a turbine engine having an unducted fan], which application describes an example of such a coupling between the lever arm and the outer ring of the LTB.

Thus, as shown by the linkage in FIGS. 2 and 3, when the actuator 34 is actuated, its chamber 38 moves the outer ring 44 of the LTB axially, thereby driving pivoting of the lever arm 54 and corresponding pivoting of the control shafts 48 about their radial axes Z-Z, and consequently drives a turning movement of each blade root support 30 in the rotary ring 20 that carries it.

Naturally, the link mechanism between the control shafts 48 and the LTB 40 with the corresponding linkage could be different. For example, it would be possible to have recourse to pitch rods between the lever arms and the outer ring of the bearing, as described in patent application WO2013/050704.

The internal portion 50 and the external portion 52 of each control shaft 48 of the invention are parts that are independent of each other. In particular, given its small size, the internal portion 50 may be mounted from inside the hub casing 49, even if it is of small diameter. Furthermore, when this internal portion is mounted on the hub casing, it acts as a plug that limits any risk of oil leaking out from the oil enclosure 47.

It should be observed that in order to enable the internal portions 50 of the control shafts to be held and be free to rotate relative to the hub casing 49, respective ball bearings 60 may be interposed between each of them and the hub casing.

Figure 4:
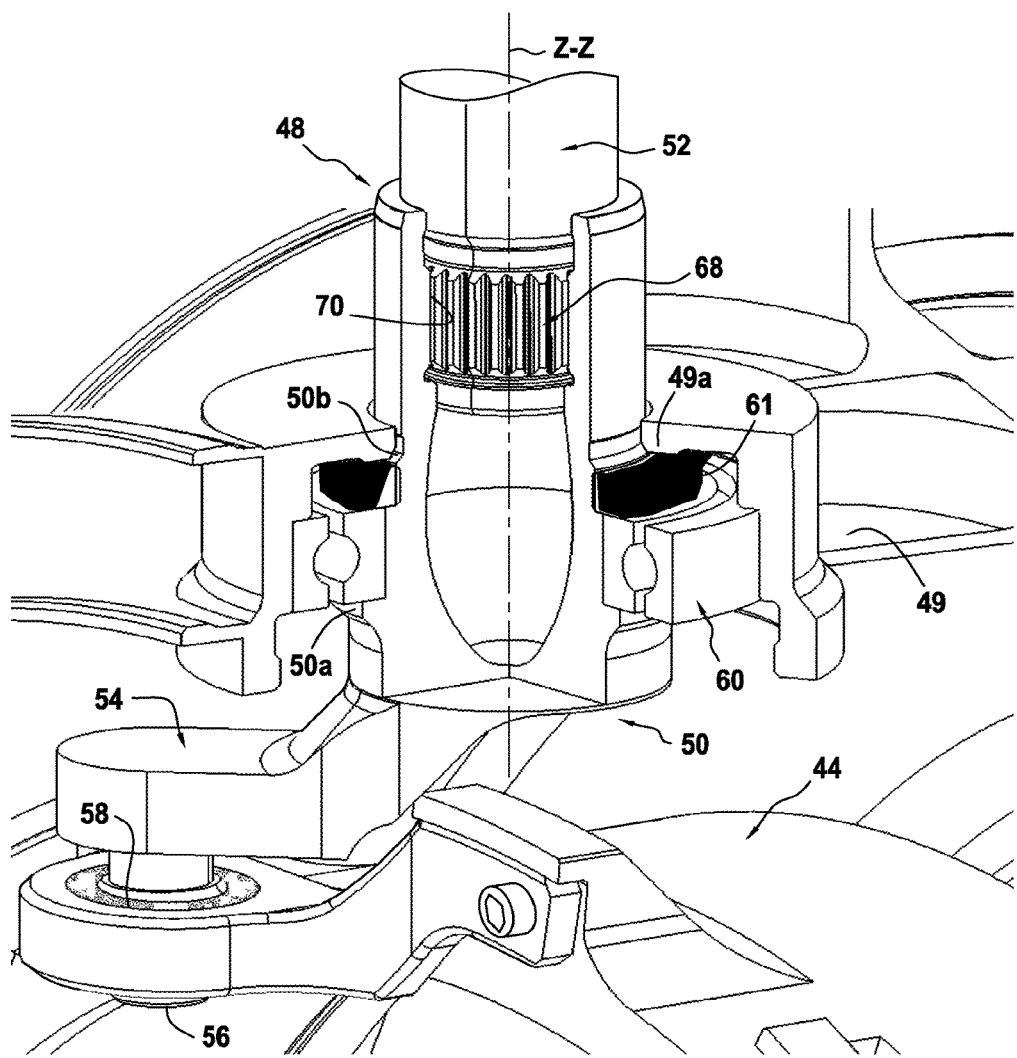
FIG. 4 is a fragmentary view of a control shaft of FIGS. 2 and 3 showing the coupling between its two portions.

Furthermore, as shown in FIG. 4, the internal portion 50 of each control shaft has a first shoulder 50*a* and a second shoulder 50*b* radially offset outwards relative to the first shoulder 50*a*. When mounting the internal portion 50 of a control shaft from the inside, its first shoulder 50*a* comes into radial abutment against the ball bearing 60 and the second shoulder 50*b* comes into abutment against a shoulder 49*a* of the hub casing 49.

It should be observed that a nut 61 may be interposed between the ball bearing 60 and the shoulder 49*a* of the hub casing 49. Furthermore, the shapes of the second shoulder 50*b* of the internal portion 50 of each control shaft, and of the shoulder 49*a* of the hub casing are designed in such a manner as to limit the leakage sections out from the oil enclosure in which the LTB is housed. Indeed, a labyrinth seal could be positioned where these two elements 50*b* and 49*a* bear against each other.

The ball bearing 60 may be secured to the hub casing 49. Under such circumstances, the diameter of the second shoulder 50*b* of the internal portion of the control shaft is smaller than the inside diameter of the ball bearing so as to enable this internal portion to be inserted from the inside. Alternatively, the ball bearing 60 may be secured to the internal portion 50 of the control shaft. Under such circumstances, the inside diameter of the passage through the hub casing 49 needs to be large enough to allow the outer ring of the ball bearing to pass therethrough and thus make it possible to extract the assembly comprising the internal portion of the control shaft and the ball bearing. The external portion 52 of the control shaft can be mounted from the outside of the air-flow passage through the engine, i.e. from beside the rotary ring 20, by passing through an orifice provided therein for this purpose, thereby avoiding any need to dismantle the mechanisms in the oil enclosure 47 during maintenance operations when action needs to be taken only on the blade roots on the rotary ring.

By way of example, the external portion of the control shaft is held on the rotary ring 20 by means of a nut 62 centered on the radial axis Z-Z of the control shaft and tightened onto its outer end.

As for their internal portions, it should be observed that in order to enable the external portions 50 of the control shafts to be held and to be free to turn relative to the rotary ring 20, a ball bearing 64 may be interposed between each control shaft and the rotary ring, each bearing being held by tightening another nut 66 on the rotary ring. Since this nut 66 is advantageously accessible from the outside, it is thus easy to manipulate from the outside in order to assemble/disassemble the outer portion of the control shaft.

Furthermore, the system for retaining the outer portion of the control shaft while leaving it free to turn is advantageously positioned at a distance from the blade root supports 30 so that the external portion can be put into place and removed independently of the blades.

The internal portion 50 and the external portion 52 of each control shaft 48 of the invention are coupled together by any known coupling mechanism.

For example, as shown in greater detail in FIG. 4, the external portion 52 of the control shaft may have external fluting 68 at its outer periphery extending along with the radial axis Z-Z, for co-operating with the internal fluting 70 of complementary shape in the internal portion 50 of the control shaft so as to couple them together.

The invention claimed is:

1. A radial control shaft for a control device for controlling a pitch of fan blades of a turbine engine having an unducted fan, said control shaft comprising:
   an external portion that is designed to be mounted to an outer portion of the control device and to be coupled to at least one fan blade in order to adjust the pitch of the at least one fan blade; and
   an internal portion, independent of the external portion, that is designed to be mounted to an inner portion of the control device, to be connected to a load transfer bearing in order to pivot said control shaft about a radial axis,
   wherein the external and internal portions of the control shaft are coupled to each other,
   wherein the internal portion of the control shaft is designed to be mounted through a hub casing with a ball bearing interposed between the internal portion of the control shaft and the hub casing,
   wherein for closing an oil enclosure in which said load transfer bearing is housed, a shoulder of the internal portion and a shoulder of the hub casing are designed to act as a plug that limits any risk of oil leaking out from the oil enclosure, and
   wherein the internal portion of the control shaft has a first shoulder designed to come radially into abutment against the ball bearing while the internal portion is being mounted to the inner portion of the control device, and the shoulder of the internal portion that is radially offset outwards relative to the first shoulder is designed to come into abutment against the shoulder of the hub casing while mounting the internal portion to the inner portion of the control device, and a nut being interposed between the ball bearing and the shoulder of the hub casing.

2. The control shaft according to claim 1, wherein the external and internal portions of the control shaft are coupled to each other by fluting of complementary shapes.

3. The control shaft according to claim 1, wherein the internal portion of the control shaft includes a lever arm designed to be coupled to an outer ring of the load transfer bearing.

4. The control shaft according to claim 3, wherein the lever arm includes a finger extending radially inward which cooperates with a sliding ball joint carried by the outer ring of the load transfer bearing.

5. The control shaft according to claim 1, wherein the external portion of the control shaft includes a coupling system for coupling to the at least one fan blade.

6. The control shaft according to claim 1, wherein the external portion of the control shaft is designed to be mounted on a rotary ring and to be held thereon by a nut.

7. The control shaft according to claim 1, wherein the radial axis of the control shaft is offset in at least one of an axial direction or tangential direction relative to a pitch axis of the at least one fan blade that the control shaft controls.

8. A method of mounting the radial control shaft according to claim 1, the method comprising:
   mounting the external portion of the control shaft to the outer portion of the control device;
   mounting the internal portion of the control shaft to the inner portion of the control device; and
   coupling together the internal and external portions of the control shaft.

9. The control shaft according to claim 1, wherein the external portion is removable from the internal portion without removing the oil enclosure.

10. A device for controlling the pitch of fan blades of a turbine engine having an unducted fan, the device comprising:
    the radial control shaft according to claim 1, the external portion of the control shaft being coupled to one of the fan blades, and the internal portion of the control shaft being mechanically linked to a load transfer bearing designed to enable said control shaft to pivot about the radial axis.

11. The device according to claim 10, wherein a rotary ring holds the external portion of the control shaft radially and leaves the control shaft free to turn.

12. The device according to claim 10, further comprising a hub casing that serves to hold the internal portion of the control shaft radially and leaves the control shaft free to turn.

* * * * *

UNITED STATES PATENT AND TRADEMARK OFFICE
CERTIFICATE OF CORRECTION

PATENT NO. : 10,408,069 B2
APPLICATION NO. : 15/150832
DATED : September 10, 2019
INVENTOR(S) : Olivier Belmonte et al.

Page 1 of 1

It is certified that error appears in the above-identified patent and that said Letters Patent is hereby corrected as shown below:

On the Title Page

Item (71), the Applicant is incorrect. Item (71) should read:
-- (71) Applicant: SAFRAN AIRCRAFT ENGINES, Paris (FR) --

Signed and Sealed this
Twelfth Day of November, 2019

Andrei Iancu
*Director of the United States Patent and Trademark Office*